US006585523B2

(12) United States Patent
Tokunaga et al.

(10) Patent No.: US 6,585,523 B2
(45) Date of Patent: Jul. 1, 2003

(54) MAGNETIC MATERIAL-INVERTING DISPLAY PANEL

(75) Inventors: Masami Tokunaga, Kanagawa (JP); Masahiko Ikeda, Kanagawa (JP); Takeo Yokoyama, Kanagawa (JP); Hideki Misawa, Kanagawa (JP)

(73) Assignee: Kabushiki Kaisha Pilot, Tokyo (JP)

( * ) Notice: Subject to any disclaimer, the term of this patent is extended or adjusted under 35 U.S.C. 154(b) by 0 days.

(21) Appl. No.: 09/768,296

(22) Filed: Jan. 25, 2001

(65) Prior Publication Data

US 2001/0018108 A1 Aug. 30, 2001

(30) Foreign Application Priority Data

Jan. 26, 2000 (JP) ........................................ 2000-054751
Jul. 4, 2000 (JP) ........................................ 2000-239169

(51) Int. Cl.⁷ .................................................. B43L 1/00
(52) U.S. Cl. ........................................ 434/409; 428/402
(58) Field of Search .................... 148/105; 428/402, 428/215; 434/409

(56) References Cited

U.S. PATENT DOCUMENTS

| 4,143,472 A | | 3/1979 | Murata et al. | |
|---|---|---|---|---|
| 4,368,952 A | * | 1/1983 | Murata et al. | ............... 359/296 |
| 4,536,428 A | | 8/1985 | Murata et al. | |
| 5,151,032 A | * | 9/1992 | Igawa | ........................ 434/409 |
| 5,295,837 A | * | 3/1994 | Gilano et al. | ................ 434/309 |
| 5,411,398 A | * | 5/1995 | Nakanishi et al. | .......... 273/239 |
| 5,429,503 A | * | 7/1995 | Murata et al. | ............... 434/409 |
| 6,007,734 A | * | 12/1999 | Tazaki et al. | ............. 252/62.53 |
| 6,235,378 B1 | * | 5/2001 | Lowder | ....................... 428/215 |

FOREIGN PATENT DOCUMENTS

| EP | 0 010 354 | 7/1983 |
|---|---|---|
| GB | 2 065 908 | 7/1981 |
| GB | 2 071 865 | 9/1981 |
| JP | 59-32796 | 8/1984 |
| JP | 04-199086 | 7/1992 |

\* cited by examiner

Primary Examiner—Derris H. Banks
Assistant Examiner—Bena B. Miller
(74) Attorney, Agent, or Firm—Rader, Fishman & Grauer PLLC

(57) ABSTRACT

A magnetic material-inverting display panel wherein a liquid dispersion, which has a yield value and contains a magnetic display material in fine particle form having magnetic poles of opposite signs tinged with different colors by placing an opaque thin metal layer on at least one surface and making the color of another surface different from that of the thin metal layer of one surface, a dispersion medium and a thickener as main components, is supported by a support. The total area of S-pole-surfaces or N-pole-surfaces of the magnetic display material in fine particle form being from 60 to 1500% of the display surface area of the display panel. The magnetic material-inverting display panel of this invention has whereby a good contrast and forms a display of a metallic tone or a pastel color tone.

18 Claims, No Drawings

MAGNETIC MATERIAL-INVERTING DISPLAY PANEL

TECHNICAL FILED OF THE INVENTION

The present invention relates to a magnetic material-inverting display panel which forms a display by inverting magnetic display material with a magnet and erasing the display by inverting the materials with a magnet from the same side. More precisely, it relates to a magnetic material-inverting display panel wherein a magnetic display material having magnetic poles of opposite signs tinged with different colors by placing an opaque thin metal layer on one surface and making the color of another surface different from that of the thin metal layer of one surface.

BACKGROUND OF THE INVENTION

In a prior magnetic display panel, fine particles of a magnetic material are dispersed into a dispersion. A display was formed by migrating the magnetic particles to a surface of the panel at which a magnet is operated. The display was erased through precipitation of the magnetic particles by operating a magnet from the opposite surface. This type of the magnetic display panel had a drawback that the apparatus becomes complex and large since erasure of a display should be carried out from backside of the panel. In addition, when said magnetic particles were migrated to the display panel, it was difficult to erase only unnecessary part of the display.

Furthermore, Japanese Patent Publication No. 59-32796/1984, which is incorporated herein by reference, proposes a magnetic display panel which realizes a display by inverting display magnetic particles. The panel uses a liquid dispersion dispersed with magnetic particles having a residual magnetic moment of 0.2 to 10 emu/g and a coercive force of not less than 500 oersteds, and having a yield value of not less than 5.0 N/m².

SUMMARY OF THE INVENTION

The panel, however, had suffered from problems of a low contrast and an unclearness owing to insufficient inversion even when a display was formed by inverting magnetic particles or the display was erased.

The purpose of the present invention is to provide a magnetic material-inverting display panel which improves clearness of a display and its erasure of the panel, the display being formed by inverting magnetic display material. In particular, a liquid dispersion in a display panel has a yield value and contains a magnetic display material in fine particle form having magnetic poles of opposite signs tinged with different colors by providing an opaque thin metal layer on at least one surface and making the color of another surface different from that of the thin metal layer of the one surface, the dispersion also includes a dispersion medium and a thickener as other main components and is supported by a support. A ratio between the inner volume V of the support supporting the liquid dispersion and the volume W of the magnetic display material in fine particle form is W/V×100=1 to 17%. Total area of S-pole-surfaces or N-pole-surfaces of the magnetic display material in fine particle form to be dispersed in a liquid dispersion of the panel is from 60% to 1500% of the display surface area of the display panel.

PREFERRED EMBODIMENTS OF THE INVENTION

The magnetic display material to be used in the present invention is a magnetic material having magnetic poles of opposite signs tinged with different colors by placing an opaque thin metal layer on one surface and making the color of another surface different from that of the thin metal layer of one surface. The magnetic material is inverted by the action of magnetism to form a display. For example, when the display surface of the panel is swept with S-pole of a writing magnet, N-pole surfaces of the magnetic material is arranged at the panel surface to make it N-pole color. Upon writing the surface with N-pole of the magnetic pen, the magnetic material is inverted and S-pole surface appears to form a display of the color. When the panel is again swept with S-pole of the magnetic pen, the materials are inverted and the display disappears, whereby display having a color of the metal and a color of the magnetic material is obtained.

In the present invention, the ratio between the inner volume V of the support supporting the liquid dispersion and the volume W of the magnetic display material in fine particle form should preferably be W/V×100=1% to 17%. When the ratio is smaller than 1%, a display tends to be unclear owing to the small amount of the display material, and, when the ratio exceeds 17%, smooth inversion tends to be difficult owing to mutual interference of the display material at the inversion. The same volume ratio is preferred in the cases where the magnetic display material is conteined in a honeycomb cell or a capsule. The ratio between the inner volume V of a unit cell or a unit capsule and the volume W of the magnetic display material therein should also preferably be W/V×100=1% to 17%.

Furthermore, in the present invention, the total surface area of S-poles or N-poles of the magnetic display material should be from 60% to 1500% of the display surface area of the display panel for realizing a clear display.

The display surface area of the display panel means the area of the flat surface for displaying as a display panel containing a liquid dispersion in which the magnetic display material is dispersed.

The present inventors have discovered that one of the reasons of unclear display of the earlier magnetic material-inverting display panel is improperness of the surface area of S-poles or N-poles of the magnetic material for displaying relative to the display surface area of the panel. Another reason is insufficient inversion of the magnetic material.

When the surface area of S-poles or N-poles of the magnetic material for displaying is smaller than 60% of the display surface area of the panel, the displayed color tends to be pale and color difference between the displayed color and the color of the background support tends to be small, so that the contrast becomes low and the resulting display becomes unclear.

On the other hand, when the surface area exceeds 1500%, owing to too much degree of mutual interference of magnetic material, the inversion tends to be difficult to result in occurrence of an uninverted material, a material showing boundary surface between the S-pole and the N-pole, and the like, so that the resulting display has a mixed color thereof and a clear display cannot be formed.

The liquid dispersion in which the magnetic display material is dispersed must have a specific yield value and viscosity. The yield value is necessary for properly dispersing the magnetic display material in the liquid dispersion, inverting it properly by magnetism, and preventing their precipitation. The viscosity is required for inverting only the part exposed to magnetism when the display panel is exposed to magnetism. Namely, it is preferred that the liquid dispersion has a yield value of 0.15 to 7.5 N/m² and a viscosity of 3 to 350 mPa·s. As a thickner for imparting a yield value, an inorganic substance such as AEROSIL can be used. Inorganic thickners, however, have drawbacks that the viscosity and the yield value change with a lapse of time. To the contrary, an organic thickner selected from fatty acid bisamides, hydrogenated castor oil, and amides of N-acylamino acids is preferable owing to advantages that they impart a yield value, and the viscosity and the yield value hardly change with a lapse of time.

In the case that the liquid dispersion has a yield value and a viscosity of out of the ranges of 0.15 to 7.5 $N/m^2$ and 3 to 350 mPa·s respectively, although the yield value and the viscosity are still acceptable, stability in maintenance of the formed display tends to be deteriorated and, owing to assembly of surrounding magnetic material at writing with a magnetic pen, distribution of the magnetic material tends to be inhomogeneous, so that the color of periphery of a display formed through inversion and the color of background of the display formed by an uninverted magnetic material at the surrounding part of the display tends to change. As a result, the display tends to unclear as a whole and thus, the clearness tends to be deteriorated.

The magnetic display material to be used in the present invention has different colors at the S-pole surface and the N-pole surface. So long as an opaque thin metal layer is placed on its one surface, it is not limited to a particular form or shape. However, in view of the display-formability at writing with a magnetic pen and clearness of the display formed, it is preferred that the magnetic display material is obtained by dispersing magnetic particles into a synthetic resin and/or synthetic rubber composition having a specific color to form a magnetic layer, and cutting or pulverizing a laminate formed by placing an opaque thin metal layer at one surface of the layer or the magnetic display material is obtained by laminating a colored sheet having a different color on one surface, and cutting or pulverizing a laminate formed by placing an opaque thin metal layer on at least one surface. The color of the surface on which an opaque thin metal layer is not placed may be the color of the magnetic material itself without coloring the magnetic material layer. Also, a colored layer may be provided on both surfaces or on one surface, while the thin metal layer is provided on one surface.

Alternatively, the S-pole surface and N-pole surface are tinged with different colors, and a clear thin metal layer may be provided on both surfaces to result in a color of metallic tone.

From the present inventors' study, the magnetic display material is inverted by the action of magnetic force of the opposite pole, and a magnetic material in a flat or foil form or shape is inverted in a stacked state with sliding each other. Accordingly, such material is preferable because not only the speed of formation of a display is high but also a clear display is formed with little coexistence of an uninverted or insufficiently inverted material.

In particular, in the case of flat or foil-shaped magnetic display material, it should be careful that, when total surface area of S-poles or N-poles of the magnetic display material is not less than 1500% of display area of the panel, inversion of the stacked material with sliding each other becomes insufficient owing to the mutual interference.

Most preferred unclear layer placed on colored surfaces of the magnetic particles is an unclear thin layer formed by metal vapor deposition.

When an unclear thin metal layer is provided on the magnetic display material, a display is formed by a combination of metallic luster and non-metallic luster, so that a high contrast and an improved clearness of the display are resulted in.

The magnetic display material tends to be charged with static electricity owing to friction between them at the inversion. Especially, the flat or foil-shaped magnetic display material is easy to be electrostatically charged since they are inverted in a stacked state with sliding each other. When the magnetic display material is electrostatically charged, the magnetic display material aggregates, so that its smooth inversion becomes difficult or some of the material is not inverted. As a result, there occurs a case that a clear display by the magnetic display material tinged with different colors cannot be attained, and therefore, the electrostatic charging is not preferred. A good display can be attained by mixing an antistatic agent into the liquid dispersion of the magnetic display material.

As the antistatic agent, one or more selected from sulfation products of polybutene, aliphatic alkyl quaternary ammonium salts, aminoethanol-epichlorohydrin polycondensates, alkylbenzenesulfonic acids, metallic salts of alkylsalicylic acids, sulfosuccinic acid salts, dialkylsulfosuccinic acid salts, and metallic salts of dodecylbenzenesulfonic acid may be used. In particular, preferred are a mixture of sulfation products of polybutene, aliphatic alkyl quaternary ammonium salts, aminoethanol-epichlorohydrin polycondensates, and alkylbenzenesulfonic acids, a mixture of chromium salts of alkylsalicylic acids, calcium salt of sulfosuccinic acid, and a polymer.

The support for supporting a liquid dispersion of magnetic display material is not particularly limited and the following are optionally used: a support composed of two substrates placed with a space between them and sealed at their periphery; a support wherein regular hexagonal honeycomb cells are placed between above two substrates; a support wherein capsules are placed at the substrate; and the like.

EXAMPLES

Examples of the present invention are described but the present invention is not limited to the examples.

Example 1

On a PET film having a thickness of 25 μm as a base film, a green-colored magnetic ink consisting of the composition of the formulation shown in Table 1 was prepared, coated, and dried according to the following procedures to obtain a green magnetic sheet. At that time, thickness of the magnetic ink layer was 10 μm and the coating weight was 14.0 $g/m^2$.

Procedure 1

A resin was dissolved in MEK in a ratio described in Table 1, and magnetic powder was added thereto. Then, the whole was dispersed for 1 hour in an attritor.

Procedure 2

To the dispersion, a blue ink, a yellow ink, and a white ink manufactured by Mikuni Color Ltd., each of which is formed by dispersing a pigment in MEK, were added in a ratio of the formulation (A). Thereafter, the whole was mixed with stirring to obtain a magnetic ink showing a green color.

Procedure 3

The magnetic ink was coated by means of a die coater at a rate of 30 m/minute and dried to obtain the aforementioned green magnetic sheet.

Then, the sheet was cut into pieces of 100 mm×140 mm, and aluminum was vapor-deposited on the green magnetic layer using an apparatus for vapor deposition manufactured by SINKU-RIKO, INC. (model FA-504) to obtain a two-colored sheet tinged with green at the base film side and with silver at the opposite side.

At that time, the thickness of the vapor-deposited layer was 0.05 μm and, upon the measurement of the two-colored sheet after vapor deposition, the weight of the aluminum vapor-deposited layer together with the ink layer was 14.1 g/m².

Subsequently, the two-colored sheet was magnetized together with the base film to make the green-colored side of the two-colored sheet N-pole and the silver-colored side S-pole, and then the two-colored sheet was detached from the base film to result in a thin film. The thin film was further pulverized in a small mill (manufactured by Kyorisu Riko K. K: SK-M3 type sample mill) and then sieved to obtain a magnetic display material which had a particle size of the range of 63 to 212 μm and were tinged with two colors of green/silver.

TABLE 1

Formulation (A)

| | | |
|---|---|---|
| Blue ink | 5.6 parts by weight | MHI BLUE #454: Manufactured by Mikuni Color Ltd. |
| Yellow ink | 22.3 parts by weight | MHI YELLOW #593: Manufactured by Mikuni Color Ltd. |
| White ink | 10.0 parts by weight | MHI WHITE #2179: Manufactured by Mikuni Color Ltd. |
| Magnetic powder | 19.0 parts by weight | GP-300: Manufactured by Toda Kogyo Corporation |
| Resin | 22.8 parts by weight | EPICOAT #1007: Manufactured by Yuka Shell Epoxy Kabushiki Kaisha |
| Solvent | 20.3 parts by weight | MEK |

Next, isoparaffin having a viscosity at 25° C. of 2.0 mPa·s (manufactured by Esso Chemical Co., Ltd.: commercial name ISOPAR-M) as a dispersion medium and ethylenebis-12-hydroxystearic acid amid (ITOH WAXJ-530, manufactured by Itoh Oil Chemicals Co., Ltd.) as a thickner were mixed in a ratio of 70 parts by weight of the former to 30 parts by weight to form a dispersion. Then, the dispersion was diluted with isoparaffin so that the ratio of isoparaffin to the thickner became 407.92 parts by weight to 12.42 parts by weight. An antistatic agent (STADIS-450, manufactured by E. I. Dupont Co., Ltd.) was added thereto so as to amount to 0.15% of the total to obtain a dispersion having a yield value of 1.76 N/m² and a viscosity at 25° C. of 16 mPa·s.

The yield value was determined according to a method of reading a torsional angle of rotor when the dispersion was rotated at a low speed using Brookfield viscometer (BL-type manufactured by Tokyo Keiki Co. Ltd.) similarly to the conventional method. A No. 2 rotor attached to the above BL-type viscometer was used as the rotor.

Moreover, regarding to the measurement of the viscosity, the value under the conditions of shear stress of 10 Pa was measured using a stress-controlling rheometer (CSL-100 manufactured by Carri-Med Ltd.).

Successively, the magnetic display material tinged with two colors of green/silver were mixed into the dispersion in a ratio of 15 parts by weight of the magnetic display material to 100 parts by weight of the dispersion and the whole was stirred to obtain a liquid dispersion wherein the magnetic display material were homogeneously dispersed in the dispersion. Specific gravity of the liquid dispersion was determined to be 0.84.

Then, the liquid dispersion was charged into cells of multi-cell structure of honeycomb cells with partition walls made of vinyl chloride resin, the honeycomb cells being regular hexagonal, having a unit cell size of 3 mm and a height of 0.8 mm, and being adhered to a PVC film having a film thickness of 0.12 mm at the one side by an adhesive. Thereafter, open surface of the multi-cell structure was covered with a PVC film having a thickness of 0.1 mm by an adhesive, so that the liquid dispersion was sealed in the cells to obtain a display panel. At that time, the ratio of total area of one color of the magnetic display material contained in the display panel to the display surface of the panel was 622% according to the following calculation.

(1) Display surface area of honeycomb cells having a cell size of a mm is $S_{honeycomb}=(\sqrt{3}/2) \times a^2$. Therefore, in the case of honeycomb cells having a cell size of 3 mm, $S_{honeycomb}= 3 \times 3 \times \sqrt{3} \div 2=7.794$ mm².

(2) On the other hand, sum of the layer area of one-color side of the magnetic display material is represented as follows: $S_{particles}$=volume of cells×specific gravity of contained liquid×concentration of particles÷specific gravity of particles÷thickness of particles. Therefore, $S_{particles}$=7.794× 0.8×0.84×(15÷115)÷(14.1÷10.05)÷0.01005=48.44 mm².

(3) Accordingly, the ratio of the layer area of one surface of the magnetic display material to the area of the honeycomb is as follows: 48.44÷7.794×100=622(%).

And, the ratio between the inner volume V of one unit cell and the volume W of the magnetic display particles contained in the cell was W/V×100=7.8%.

By contacting S-pole of a magnet to one side of the panel, a green-colored display surface was formed through pulling the magnetic display material tinged with two colors in the honeycomb cells near to the front side and placing it so as to arrange the particles with partial stacking. Then, when writing operation was carried out with N-pole of a magnet on the surface of the PVC film, a clear display having silver-colored metallic luster could be obtained on the green-colored display surface corresponding to the part where N-pole of the magnet passed.

Next, when the rubbing operation with S-pole of the magnet was again carried out on the silver-colored display part, the magnetic display material whose silver surface faced the surface of the panel was inverted and it was possible to return the part again to green-colored display surface.

Example 2

A liquid dispersion was obtained in a similar manner to Example 1 with the exception that the mixing ratio of the magnetic display material to 100 parts by weight of the dispersion was changed to 2 parts by weight. At that time, specific gravity of the liquid dispersion was 0.80 and the ratio of display area of one surface of the magnetic display material to the display surface of the display panel was 89% determined according to aforementioned calculation. In addition, the ratio between the inner volume of one cell and the volume of the magnetic display material contained in one cell was 1.1%.

By contacting S-pole of a magnet to one side of the panel, a green-colored display surface was formed through pulling the magnetic display material tinged with two colors in the honeycomb cells near to the front side and placing it so as to arrange the particles with partial stacking. Then, when writing operation was carried out with N-pole of a magnet on the surface of the PVC film, a clear display having silver-colored metallic luster was obtained on the green-colored surface corresponding to the part where N-pole of the magnet passed.

Next, when the rubbing operation with S-pole of the magnet was again carried out on the silver-colored display part, the magnetic display material whose silver surface faced the front side was inverted and it was possible to return the part again to green-colored display surface.

Example 3

Similarly to Example 1, a green magnetic ink was prepared and then applied onto a PET film having a thickness of 25 μm to form a green magnetic sheet having a dry thickness of 9 μm and a coating weight of 12.59 g/m². Successively, aluminum was vapor-deposited on the sheet in a similar manner to Example 1. The thickness of the green magnetic sheet after vapor deposition of aluminum was 9.05 μm and the total weight was 12.72 g/m².

A liquid dispersion was prepared in a similar manner to Example 1 with the exception that the mixing ratio of the magnetic display material to 100 parts by weight of the dispersion was changed to 35 parts by weight. At that time, specific gravity of the liquid dispersion was 0.89 and the ratio of display area of one surface of the magnetic display material to the display surface of the display panel was 1458% determined according to aforementioned calculation. In addition, the ratio between the inner volume of one cell and the volume of the magnetic display material contained in one cell was 16.5%.

By contacting S-pole of a magnet to one side of the panel, a green-colored display surface was formed through pulling the magnetic display material tinged with two colors in the honeycomb cells near to the front side and placing it so as to arrange the particles with partial stacking. Then, when writing operation was carried out with N-pole of a magnet on the surface of the PVC film, a clear display having silver-colored metallic luster was obtained on the green-colored surface corresponding to the part where N-pole of the magnet passed.

Next, when the rubbing operation with S-pole of the magnet was again carried out on the silver-colored display part, the magnetic display material whose silver surface faced the front side was inverted and it was possible to return the part again to green-colored display surface.

Example 4

A clear yellow ink composed of a formulation shown in following Table 2 was applied onto a PET film having a thickness of 25 μm and dried to obtain a clear yellow ink layer having a dry thickness of 4 μm.

Subsequently, an aluminum vapor-deposited layer having a thickness of 0.05 μm was formed thereon in a similar manner to Example 1, and the same-green-colored magnetic ink as prepared in Example 1 was further applied onto the layer to form a green magnetic layer having a dry thickness of 10 μm and a coating weight of 13.99 g/m².

As described above, a two-colored sheet having a gold color at one side and a green color at another side was obtained. After the sheet was magnetized to make the green side N-pole and the gold side S-pole similarly to Example 1, the resulting sheet was pulverized and sieved to obtain a magnetic display material which had a particle size of the range of 63 to 212 μm and were tinged with two colors of green/gold.

TABLE 2

| Yellow ink | 2.0 parts by weight | MHI YELLOW #593: Manufactured by Mikuni Color Ltd. |
|---|---|---|
| Resin | 20.0 parts by weight | EPICOAT #1007: Manufactured by Yuka Shell Epoxy Kabushiki Kaisha |
| Solvent | 30.0 parts by weight | MEK |

Successively, the magnetic display material tinged with two colors of green/gold were mixed into the dispersion in a ratio of 15 parts by weight of the magnetic display material to 100 parts by weight of the dispersion and the whole was stirred to obtain a liquid dispersion wherein the magnetic display material were homogeneously dispersed in the dispersion. Specific gravity of the liquid dispersion was determined to be 0.84.

Then, the liquid dispersion was charged into cells of multi-cell structure of a honeycomb cells made of vinyl chloride resin, the honeycomb cells being regular hexagonal, having a cell size of 3 mm and a height of 0.8 mm, and being adhered to a PVC film having a film thickness of 0.12 mm at the one side by an adhesive. Thereafter, open surface of the multi-cell structure was covered with a PVC film having a thickness of 0.1 mm by an adhesive, so that the liquid dispersion was encapsulated into the cells to obtain a display panel. At that time, the ratio of total area of one color of the magnetic display material contained in the display panel to the display surface of the panel was 466% according to the aforementioned calculation. In addition, the ratio between the inner volume of one cell and the volume of the magnetic display material contained in one cell was 8.2%.

By contacting S-pole of a magnet to one side of the panel, a green-colored display surface was formed through pulling the magnetic display material tinged with two colors in the honeycomb cells near to the front side and placing it so as to arrange the particles with partial stacking. Then, when writing operation was carried out with N-pole of a magnet on the surface of the PVC film, a clear display having gold-colored metallic luster was obtained on the green-colored surface corresponding to the part where N-pole of the magnet passed.

Next, when the rubbing operation with S-pole of the magnet was again carried out on the gold-colored display part, the magnetic display material whose gold surface faced the front side was inverted and it was possible to return the part again to green-colored display surface.

Example 5

A clear blue ink composed of a formulation shown in following Table 3 was applied onto a PET film having a thickness of 25 μm and dried to obtain a clear blue ink layer having a dry thickness of 4 μm.

Then, an aluminum vapor-deposited layer having a thickness of 0.05 μm was formed on the clear blue ink layer in a similar manner to Example 1, and a magnetic ink composed of a formulation shown in following Table 4 was further applied onto the deposited layer to obtain a magnetic layer having a dry thickness of 10 μm and a coating weight of 13.47 g/m².

Subsequently, a yellow ink composed of a formulation shown in following Table 5 was applied onto the magnetic layer to laminate a yellow ink layer having a dry thickness of 18 μm and a coating weight of 27.4 g/m² and thereby, a two-colored sheet was obtained.

As described above, a two-colored sheet having a metallic blue color at one side and a yellow color at another side was obtained. After the sheet was magnetized to make the metallic blue side N-pole and the yellow side S-pole similarly to Example 1, the resulting sheet was pulverized and sieved to obtain a magnetic material which had a particle size of the range of 63 to 212 μm and had two colors of metallic blue/yellow.

TABLE 3

| Blue ink | 2.0 parts by weight | MHI BLUE #454: Manufactured by Mikuni Color Ltd. |
|---|---|---|
| Resin | 20.0 parts by weight | EPICOAT #1007: Manufactured by Yuka Shell Epoxy Kabushiki Kaisha |
| Solvent | 30.0 parts by weight | MEK |

TABLE 4

| Magnetic powder | 10.0 parts by weight | GP-300: Manufactured by Toda Kogyo Corporation |
|---|---|---|
| Resin | 20.0 parts by weight | EPICOAT #1007: Manufactured by Yuka Shell Epoxy Kabushiki Kaisha |
| Solvent | 30.0 parts by weight | MEK |

TABLE 5

| Yellow ink | 50.0 parts by weight | MHI YELLOW #593: Manufactured by Mikuni Color Ltd. |
|---|---|---|
| White ink | 50.0 parts by weight | MHI WHITE #2179: Manufactured by Mikuni Color Ltd. |
| Resin | 20.0 parts by weight | EPICOAT #1007: Manufactured by Yuka Shell Epoxy Kabushiki Kaisha |
| Solvent | 30.0 parts by weight | MEK |

Successively, the magnetic display material tinged with two colors of metallic blue/yellow were mixed into the dispersion in a ratio of 15 parts by weight of the magnetic display material to 100 parts by weight of the dispersion and the whole was stirred to obtain a liquid dispersion wherein the magnetic display material were homogeneously dispersed in the dispersion. Specific gravity of the liquid dispersion was determined to be 0.84.

Then, the liquid dispersion was charged into cells of multi-cell structure of a honeycomb cells made of vinyl chloride resin, the honeycomb cells being regular hexagonal, having a cell size of 3 mm and a height of 0.8 mm, and being adhered to a PVC film having a film thickness of 0.12 mm at the one side by an adhesive. Thereafter, open surface of the multi-cell structure was covered with a PVC film having a thickness of 0.1 mm by an adhesive, so that the liquid dispersion was encapsulated into the cells to obtain a display panel. At that time, the ratio of total area of one color of the magnetic display material contained in the display panel to the display surface of the panel was 186% according to the aforementioned calculation. In addition, the ratio of the inner volume of one cell and the volume of the magnetic display material contained in one cell was 7.5%.

By contacting S-pole of a magnet to one side of the panel similarly to Examples 1 and 2, a blue-colored display surface having metallic luster was formed.

Then, when writing operation was carried out with N-pole pole of a magnet on the surface of the PVC film, a clear yellow display was obtained on the blue-colored surface having metallic luster corresponding to the part where N-pole of the magnet passed.

Next, when the rubbing operation with S-pole of the magnet was again carried out on the yellow display part, the magnetic display material whose yellow surface faced the front side was inverted and it was possible to return the part again to blue-colored display surface having metallic luster.

Comparative Example 1

Similarly to Example 1, a green magnetic ink was prepared and then applied onto a PET film having a thickness of 25 μm to form a green magnetic sheet having a dry thickness of 6 μm and a coating weight of 8.39 g/m$^2$. Successively, aluminum was vapor-deposited on the sheet in a similar manner to Example 1. The thickness of the green magnetic sheet after vapor deposition of aluminum was 6.05 μm and the total weight was 8.53 g/m$^2$.

A liquid dispersion was obtained in a similar manner to Example 1 with the exception that the mixing ratio of the magnetic display material to 100 parts by weight of the dispersion was changed to 25 parts by weight. At that time, specific gravity of the liquid dispersion was 0.87 and the ratio of display area of one surface of the magnetic display material to the display surface of the display panel was 1632% determined according to aforementioned calculation. In addition, the ratio between the inner volume of one cell and the volume of the magnetic display material contained in one cell was 12.3%.

By contacting S-pole of a magnet to one side of the panel, a green-colored display surface was formed through pulling the magnetic display material tinged with two colors in the honeycomb cells near to the front side and placing it so as to arrange the particles with partial stacking. Then, when writing operation was carried out with N-pole of a magnet on the surface of the PVC film, inversion of the particles was insufficient and a clear display was not obtained even at the part where the magnet passed.

Comparative Example 2

A liquid dispersion was obtained in a similar manner to Example 5 with the exception that the mixing ratio of the magnetic display material to 100 parts by weight of the dispersion was changed to 50 parts by weight. At that time, specific gravity of the liquid dispersion was 0.94 and the ratio of display area of one surface of the magnetic display material to the display surface of the display panel was 529% determined according to aforementioned calculation. In addition, the ratio between the inner volume of one cell and the volume of the magnetic display material contained in one cell was 21.2%.

By contacting S-pole of a magnet to one side of the panel, a green-colored display surface was formed through pulling the magnetic display material tinged with two colors in the honeycomb cells near to the front side and placing it so as to arrange the particles with partial stacking. Then, when writing operation was carried out with N-pole of a magnet on the surface of the PVC film, inversion of the particles was insufficient and a clear display was not obtained even at the part where the magnet passed.

Comparative Example 3

A liquid dispersion was obtained in a similar manner to Example 1 with the exception that the mixing ratio of the magnetic display material to 100 parts by weight of the dispersion was changed to 1 part by weight. At that time, specific gravity of the liquid dispersion was 0.80 and the ratio of display area of one surface of the magnetic display material to the display surface of the display panel was 45% determined according to aforementioned calculation. In addition, the ratio between the inner volume of one cell and the volume of the magnetic display material contained in one cell was 0.6%.

By contacting S-pole of a magnet to one side of the panel, a green-colored display surface was formed through pulling the magnetic display material tinged with two colors in the honeycomb cells near to the front side. Then, when writing operation was carried out with N-pole of a magnet on the surface of the PVC film, the borderline between the green surface and the silver color at the written part was unclear and a clear display was not obtained.

Table 6 specifies the examples and the comparative examples and shows the evaluation.

surface or the S-pole surface of the rubber magnet was contacted to the display panel, and then the magnet was removed with detaching it in the direction perpendicular to the surface of the display panel. The N-pole surface and the S-pole surface of the magnetic display material, which appear on the surface of the display panel at that time, were observed with the eye.

Evaluation standard good: The borderline between the N-pole surface and the S-pole surface of the magnetic display material for displaying is clear.

no good: The borderline between the N-pole surface and the S-pole surface of the magnetic display material for displaying shows a mixed color and is unclear.

3. As for evaluation of the property on the light brightness, using the display panels prepared in the examples and the comparative examples, appearance was evaluated on 10 males and 10 females, i.e., 20 persons in total for the feeling difference in brightness, direction, unevenness, and the like.

TABLE 6

|  |  | Examples ||||| Comparative examples |||
| --- | --- | --- | --- | --- | --- | --- | --- | --- | --- |
|  |  | 1 | 2 | 3 | 4 | 5 | 1 | 2 | 3 |
| Yield value (N/m$^2$) | | 1.76 | 1.76 | 1.76 | 1.76 | 1.76 | 1.76 | 1.76 | 1.76 |
| Viscosity (mPa · s) | | 16 | 16 | 16 | 16 | 16 | 16 | 16 | 16 |
| Area ratio (%) | | 622 | 89 | 1458 | 466 | 186 | 1632 | 529 | 45 |
| Amount of antistatic agent (%) | | 0.15 | 0.15 | 0.15 | 0.15 | 0.15 | 0.15 | 0.15 | 0.15 |
| Volume ratio (%) | | 7.8 | 1.1 | 16.5 | 8.2 | 7.5 | 12.3 | 21.2 | 0.6 |
| Property evaluation | | | | | | | | | |
| Display formability | | good | good | good | good | good | no good | no good | good |
| Clearness | | good | good | good | good | good | no good | no good | no good |
| Light brightness | good | 15 | 0 | 18 | 10 | 4 | 1 | 3 | 0 |
| | average | 5 | 18 | 2 | 10 | 16 | 5 | 17 | 2 |
| Number of person | bad | 0 | 2 | 0 | 0 | 0 | 14 | 0 | 18 |
| Overall evaluation | | ⊚ | ○ | ⊚ | ⊚ | ⊚ | X | X | X |

Evaluation standards

Table 6 shows results of evaluating the properties of magnetic material-inverting display panels prepared in the examples and the comparative examples.

1. Evaluation of the property on the display formability was conducted according to the following evaluation standard.

Procedure

Using a rubber magnet (an anisotropic rubber magnet magnetized so as to exist magnetic poles parallel to the display panel surface and having a length of 150 mm, a height of 10 mm, and a thickness of 2 mm), the N-pole surface and the S-pole surface of the rubber magnet were alternately contacted to the surface of the display panel, and moved at a speed of 100 mm/second. The inversion state of the magnetic material at that time was observed with the eye.

Evaluation standard good: The magnetic material is uniformly inverted.

no good: Mutual interference of the magnetic material occurs to result in insufficient inversion.

2. Evaluation of the property on the clearness was conducted according to the following evaluation standard.

Procedure

Using a rubber magnet (an anisotropic rubber magnet magnetized so as to exist magnetic poles parallel to the display panel surface and having a length of 150 mm, a height of 10 mm, and a thickness of 2 mm), the N-pole Procedure Using a rubber magnet, a display was effected on the whole surface of the display panel at the thin metal layer side of the magnetic display material, and the appearance at the thin metal layer side was observed with the eye by 20 persons selected at random. The evaluation was conducted in a style of questionnaire investigation according to the three ranks (good, average, bad).

The overall evaluation including the display formability, the clearness, and the light brightness was conducted according to the following evaluation standard.

Evaluation standard

⊚: very good

○: good

X: improper

The present invention provides a magnetic display material affording an improved contrast of writing and having a relatively light color, and exhibits an effect of forming a display of a metallic tone or a pastel color tone.

The disclosure of Japanese Patent Application No. 2000-239169 filed Jul. 4, 2000, including specification, drawings and claims are herein incorporated by reference in its entirety.

What is claimed is:

1. A magnetic material-inverting display panel comprising a support that supports a liquid dispersion having a yield value and containing magnetic display material in a particle form, a dispersion medium and a thickener as main components;

the particles of magnetic display material comprise first and second surfaces, at least the first surface comprises a thin opaque metal vaccum evaporation layer having a first color, the second surface has a second color which is different from the first color, the first surface has a first magnetic pole and the second surface has a second magnetic pole which is opposite to the first magnetic pole; the support has an inner volume of V, the magnetic display material has a volume of W, and a first ratio between the inner volume V and the volume W of the magnetic display material W/V×100 is 1 to 17%; and a total area of either the first or second surface is from 60 to 1500% of a display surface area of the display panel.

2. The magnetic material-inverting display panel according to claim 1, wherein the second surface comprises a second thin metal layer having the second color.

3. The magnetic material-inverting display panel according to claim 1, wherein the second surface comprises a second thin metal layer having the first color and is tinged with the second color.

4. The magnetic material-inverting display panel according to claim 1, wherein the second surface is tinged with the second color.

5. The magnetic material-inverting display panel according to claim 1, wherein the second surface does not have a thin metal layer.

6. The magnetic material-inverting display panel according to claim 1, wherein the thickner is one or more selected from fatty acid bisamides having a hydroxide group, hydrogenated castor oil, and alkylamides of N-acylamino acids.

7. The magnetic material-inverting display panel according to claim 1, wherein the particles of magnetic display material are formed by cutting or pulverizing a laminate which comprises a thin opaque metal vaccum evaporation layer and a magnetic layer, the magnetic layer comprises magnetic particles dispersed into a synthetic resin and/or synthetic rubber composition having the second color.

8. The magnetic material-inverting display panel according to claim 1, wherein the particles of magnetic display material are formed by cutting or pulverizing a laminate which comprises a first thin opaque metal vaccum evaporation layer in the first color, a magnetic layer that is not tinged with another color and a second thin metal layer in the second color, the uncolored magnetic layer comprises magnetic particles dispersed into a synthetic resin and/or synthetic rubber composition.

9. The magnetic material-inverting display panel according to claim 1, wherein the particles of magnetic display material are formed by cutting or pulverizing a laminate which comprises a first thin opaque metal vaccum evaporation layer in the first color, a magnetic layer and a sheet of material in the second color, the magnetic layer comprises magnetic particles dispersed into a synthetic resin and/or synthetic rubber composition.

10. The magnetic material-inverting display panel according to claim 1, wherein the liquid dispersion has a yield value of 0.15 to 7.5 N/m$^2$ and a viscosity of 3 to 350 mPa·s.

11. The magnetic material-inverting display panel according to claim 1, wherein the liquid dispersion has a yield value of 0.92 to 7.5 N/m$^2$ and a viscosity of 8 to 350 mPa·s.

12. The magnetic material-inverting display panel according to claim 1, wherein the support comprises first and second substrates.

13. The magnetic material-inverting display panel according to claims 12, wherein the support further comprises a unit cell formed between the first and second substrates with a plurality of partition walls.

14. The magnetic material-inverting display panel according to claim 13, wherein a second ratio between an inner volume V of the unit cell and a volume W of the magnetic display material contained therein W/V×100 is 1 to 17%.

15. The magnetic material-inverting display panel according to any of claim 1, wherein the liquid dispersion is contained in a capsule in the support.

16. The magnetic material-inverting display panel according to claim 15, wherein the ratio between an inner volume V of the capsule and a volume W of the magnetic display material contained therein W/V×100 is 1 to 17%.

17. The magnetic material-inverting display panel according to claim 1, wherein the liquid dispersion in which the magnetic display material is dispersed as a liquid dispersion mixed with an antistatic agent.

18. A magnetic material-inverting display panel comprising a support that supports a liquid dispersion having a yield value and containing magnetic display material in a particle form, a dispersion medium and a thickener as main components;

the particles of magnetic display material comprise first and second surfaces, at least the first surface comprises an opaque metal vaccum evaporation layer having a first color, the second surface is tinged with a second color which is different from the first color, the first surface has a first magnetic pole and the second surface has a second magnetic pole which is opposite to the first magnetic pole;

the particles of magnetic display material are formed by cutting or pulverizing a laminate which comprises a magnetic layer having third and fourth surfaces, a thin opaque metal vaccum evaporation layer formed on the third surface in the first color, and the fourth surface tinged with a second color;

the magnetic layer comprises magnetic particles dispersed into a synthetic resin and/or synthetic rubber composition; the support has an inner volume of V, the magnetic display material has a volume of W, and a first ratio between the inner volume V and the volume of the magnetic display material W/V×100 is 1 to 17%; and a total area of one of the first and second surfaces is from 50 to 1500% of a display surface area of the display panel.

* * * * *